United States Patent [19]
O'Neil

[11] Patent Number: 5,706,390
[45] Date of Patent: Jan. 6, 1998

[54] ELECTRICALLY POWERED IMMERSION HEATING ELEMENTS AND CONTROLS THEREFOR

[75] Inventor: Robert Andrew O'Neil, Buxton, Great Britain

[73] Assignee: Otter Controls Limited, Derbyshire, Great Britain

[21] Appl. No.: 302,694

[22] PCT Filed: Mar. 10, 1993

[86] PCT No.: PCT/GB93/00501

§ 371 Date: Jan. 26, 1995

§ 102(e) Date: Jan. 26, 1995

[87] PCT Pub. No.: WO93/18632

PCT Pub. Date: Sep. 16, 1993

[30] Foreign Application Priority Data

Mar. 10, 1992 [GB] United Kingdom ............... 9205159

[51] Int. Cl.⁶ .............................................. H05B 3/40
[52] U.S. Cl. .................................. 392/497; 392/501
[58] Field of Search ........................... 392/497, 501, 392/498, 503, 453, 455, 451; 219/540

[56] References Cited

U.S. PATENT DOCUMENTS

| | | | |
|---|---|---|---|
| 2,437,262 | 3/1948 | Levitt et al. | 392/498 |
| 3,371,192 | 2/1968 | Rosenel | 392/498 |
| 4,697,069 | 9/1987 | Bleckmann | 219/517 |
| 5,020,128 | 5/1991 | Bleckmann | 392/498 |
| 5,459,812 | 10/1995 | Taylor | 392/498 |

FOREIGN PATENT DOCUMENTS

| | | |
|---|---|---|
| 1143834 | 2/1969 | United Kingdom . |
| 1280420 | 7/1972 | United Kingdom . |
| 2194099 | 2/1988 | United Kingdom . |
| 0380369 | 8/1990 | United Kingdom . |
| 2248519 | 4/1992 | United Kingdom . |

Primary Examiner—Tu B. Hoang
Attorney, Agent, or Firm—Hopgood, Calimafde, Kalil & Judlowe L.L.P.

[57] ABSTRACT

An electric immersion heating element has an elongate, metal-sheathed, electrically insulated, resistance heating portion (1) engaged at its ends in bores formed in an element head (2) which may be formed of a synthetic plastics material, a heat transfer element (8) formed of a high thermal conductivity material extends from a heated part of the resistance heating portion adjacent one of its ends through the element head to enable the element temperature to be sensed from the opposite side of the head, and a tubular enclosure (7) extends from the element head (2) and surrounds the part of the resistance heating portion of the element. The element construction enables dry-boil protection and automatic switch-off on boiling to be achieved by use of a single thermal sensor coupled to the heat transfer element (8) since the steam generated in the enclosure when water boils causes water to be expelled from the enclosure thereby mimicing a dry boil situation.

11 Claims, 2 Drawing Sheets

ELECTRICALLY POWERED IMMERSION HEATING ELEMENTS AND CONTROLS THEREFOR

This Application is a 371 of PCT/GB93/00501 filed on Mar. 10, 1993.

FIELD OF THE INVENTION

This invention concerns improvements relating to electrically powered immersion heating elements and controls therefor and more particularly concerns immersion heating elements and controls for water boiling vessels such as kettles, hot water jugs, pots, pans, urns and laboratory equipment for example.

BACKGROUND OF THE INVENTION

A conventional immersion heating element for an electric kettle or hot water jug comprises an elongate, metal-sheathed, electrically insulated, resistance heating element coupled to an element head plate serving for mounting of the element in a wall of the kettle or hot water jug, the resistance heating element being curved back towards the element head plate to define a so-called hot return portion which is secured to the element head plate, generally at a level above the general plane of the element.

A control for switching off the supply of power to such a heating element in the event of the associated vessel being switched on dry (a so-called dry boil situation) or being allowed to boil dry commonly comprises a bimetallic element or other thermally responsive switch actuator which is held in close thermal contact with the rear of the element head in the region thereof where the hot return portion of the element attaches to the front of the element head plate. An example of such an element protection control is the X1 control manufactured by Otter Controls Limited which is substantially as described in GB-A-2194099 with reference to FIGS. 3A, 3B and 3C of the drawings thereof.

It is further well known to provide a control for switching off the heating element when water boils in the vessel, and this is conventionally accomplished by provision of a second bimetallic element or other thermally responsive switch actuator located so as to be subject to impingement of steam thereon when water boils in the vessel. An example of such a steam sensing control is the J1 control manufactured by Otter Controls Limited which is substantially as described in GB-A-2248519 with reference to FIGS. 5A, 5B and 6 of the drawings thereof.

A single sensor electronic control for a water boiling vessel is described in GB-A-2228634. This control utilizes a thermistor and senses element temperature as a function of the electrical resistance of the thermistor and the onset of boiling as a function of the rate of change of the thermistor resistance. However, even with the current state of modern electronics a circuit capable of switching a mains load cannot readily be manufactured at a price competitive with bimetallic controls.

A single sensor control is proposed in GB-A-1 143 834 (Matsushita) but has never been manufactured, so far as we are aware. According to this proposal, a heating element as above described has an apertured enclosure provided on the element head plate in the region where the element hot return portion attaches thereto. By enclosing the hot return part of the element within an enclosure provided with small openings sufficient to admit water to the interior of the enclosure when the kettle is cold, the proposal of GB-A-1 143 834 was that the steam generated within the enclosure on boiling would drive the water from the enclosure whereupon the hot return portion of the element would overheat and cause the bimetallic or other control to operate. In accordance with the arrangement proposed in GB-A-1 143 834, a single bimetallic or other control will operate both when a kettle boils and when a kettle is switched on dry. As mentioned above, the proposal of GB-A-1 143 834 has not to our knowledge ever been manufactured despite its apparent simplicity and the promised advantage of a single sensor bimetallic control providing both element overtemperature protection and boil sensing. An automatic kettle or hot water jug thus will conventionally have separate element protection and steam sensing controls, and furthermore will commonly have a secondary or back-up element protection function operable in the event of failure of the primary element protection control.

SUMMARY OF THE INVENTION

The present invention provides a new and improved heating element construction which enables a single control to perform both element protection and boil detection functions. According to the present invention in one of its aspects, the ends (cold tails) of an elongate, metal-sheathed, electrically insulated, resistance heating element are engaged with an element head advantageously (though not essentially) formed of an appropriate heat-resistant synthetic plastics material, a heat transfer element formed of a high thermal conductivity material extends from a heated part of the element adjacent to one of its ends and through the element head to provide for sensing of the element temperature by means of an appropriate control, and an enclosure surrounds the said heated part of the element portion, the arrangement being such that in use of the heating element with a water boiling vessel the enclosure will fill with water when the vessel is filled and the onset of boiling and the consequent generation of steam in said enclosure will cause the water substantially to be expelled therefrom so as to mimic a dry boil situation sensible by an appropriate thermally-responsive control thermally coupled to said heat transfer element.

The above and further aspects of the invention are set forth in the appended claims and, together with the advantages thereof, will be clearly understood from consideration of the following description of exemplary embodiments which are illustrated in the accompanying drawings.

DETAILED DESCRIPTION OF THE EMBODIMENTS

Figure 1:
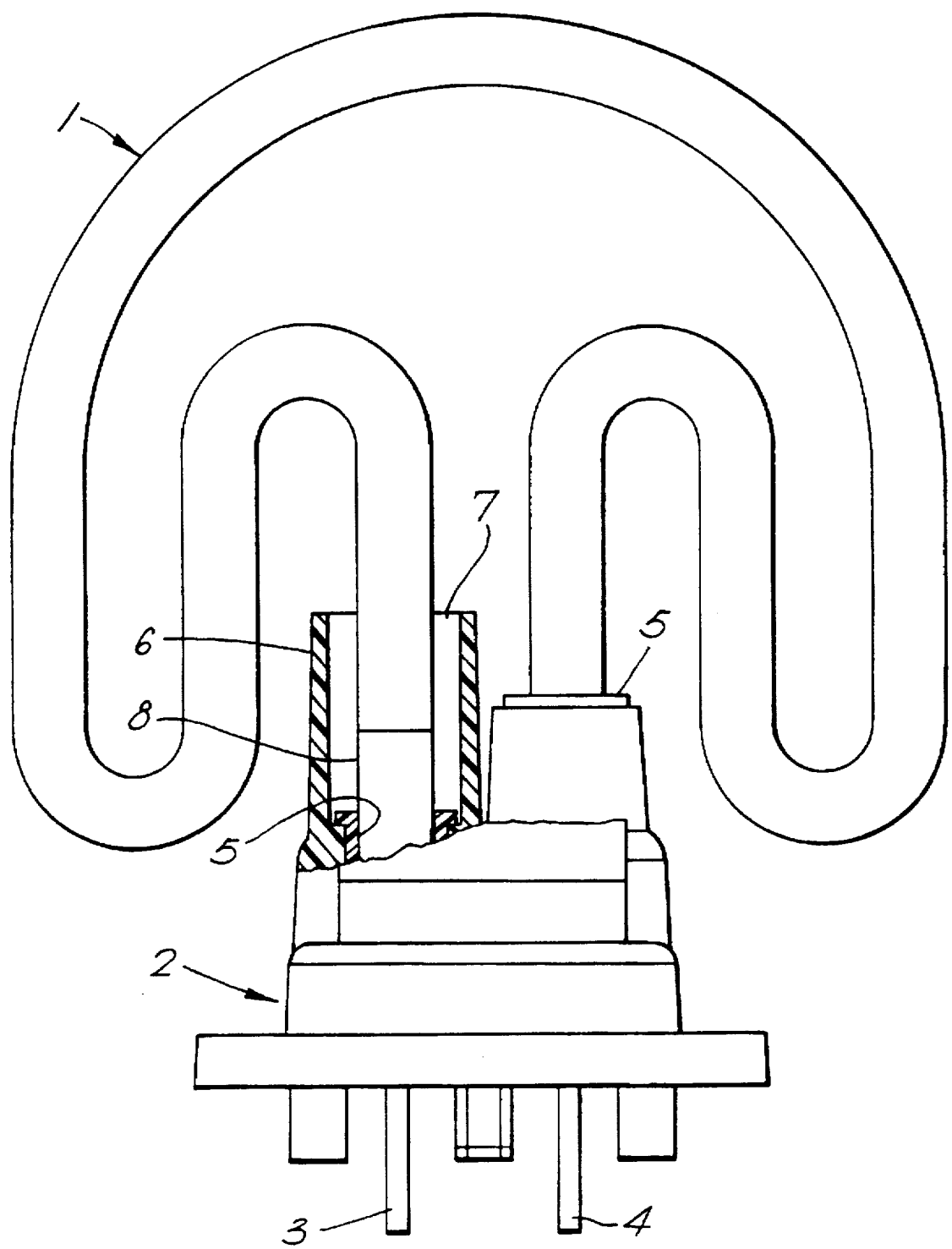
FIG. 1 is a schematic showing of a first electrically powered heating element embodying the present invention.

Referring to FIG. 1, the electrically powered immersion heating element shown therein comprises an elongate, metal-sheathed, electrically insulated, resistance heating portion 1 which, as is well known, is constructed so that the internal resistance heating wire of the element does not extend fully to the ends of the element and in consequence the ends of the element, the element cold tails, remain relatively cool in operation. The element cold tails are received within respective bores provided in a heat resistant moulded plastics element head portion 2 so that electrical terminal portions 3 and 4 of the element extend through to the opposite side of the head, grommet seals 5 (one only of which can partly be seen) formed of a temperature resistant material such as silicone rubber for example sealing the passage of the element cold tails through the head and serving furthermore to support the element in the head. Note that the resistance heating portion 1 of the heating element does not have a hot return portion such as is commonly provided in conventional heating elements.

The detailed construction of the element head portion 2 is a matter of design, but notable in this respect is the tubular forward projection 6 which extends from and is formed integrally with the head and surrounds a part of the heating element 1 adjacent to one end thereof. This tubular projection 6 defines an annular enclosure 7 surrounding a part of the resistance heating portion of the heating element, and a thermal linkage 8 formed of a high thermal conductivity material extends from this part back through the element head portion 2 to the opposite side of the head. The thermal linkage can for example comprise a copper or brass strap assembled with the element in any convenient manner, for example as a tubular extension of or an internal or external addition to the conventional element sheath.

In use of the thus described heating element with a thermally responsive switch controlling the supply of electric power to the heating element and with a thermally responsive switch actuator, for example an appropriate snap-acting bimetal, in thermal contact with the end of the abovementioned thermal linkage, the element will operate as follows. Firstly, in a dry boil situation, namely when the element is switched on without there being any water in the associated vessel, the element will rapidly overheat and the resultant element over-temperature will be transferred via the thermal linkage to the thermally responsive switch actuator so as to cause the switch to go open circuit. Secondly, in a normal boil situation, water will fill the enclosure 7 defined by the forwardly projecting tubular head portion 6 until the water reaches boiling temperature, whereupon the generation of steam within the enclosure will expel the water therefrom; the portion of the heating element within the enclosure 7 will then see a quasi dry boil situation, will rapidly overheat and will cause the thermally responsive switch to operate. The illustrated element thus enables dry boil protection and boil sensing to be achieved by use of but a single sensor element.

The invention is advantageous, furthermore, in that it enables a stainless steel heating element to be used rather than the more conventional copper or brass. Stainless steel heating elements, that is to say heating elements wherein the element sheath is formed of stainless steel, are advantageous in that they are much less susceptible to furring and corrosion in use, but they are not popular with element manufacturers on account of difficulties experienced in brazing the stainless steel element sheath to the element head, particularly at the conventionally provided hot return portion of the resistance heating portion of the element. Not only do such problems not arise with a heating element in accordance with the present invention, but also it is actually preferred to use a heating element having its sheath formed of stainless steel or of a material having a similarly low thermal conductivity as compared to copper or brass since the stainless steel does not readily conduct heat from the element part that is within the enclosure into the water surrounding the main part of the element, thereby enabling a more responsive control of element temperature to be achieved.

Figure 2:
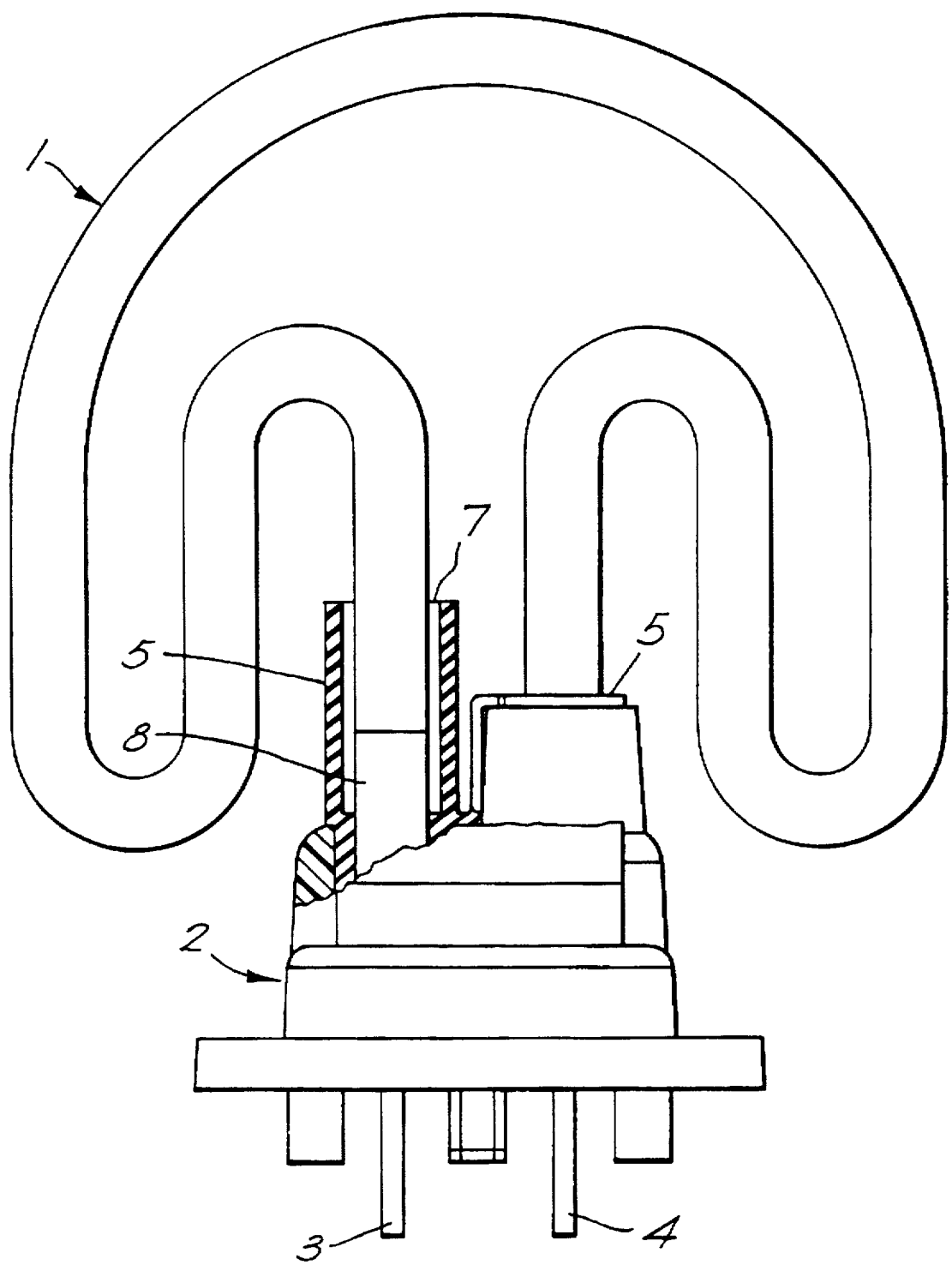
FIG. 2 is a schematic showing of a second embodiment.

FIG. 2 shows an arrangement substantially identical to that of FIG. 1 except that the enclosure 7 is defined by a forward tubular extension of the grommet seal 5 rather than by an integrally formed part of the element head 2. FIG. 2 also shows the two grommet seals 5 interconnected for convenience by means of an integral strap.

In use of an immersion heating element as herein described with an X1 control manufactured by Otter Controls Limited as aforementioned the X1 control would not perform a permanent switch-off function when the bimetal in the control responded to water boiling in an associated vessel because the bimetal would reclose its switch contacts after a period of time sufficient to enable it to cool and return to its 'cold' condition. The bimetal would thus cycle between its 'cold' and 'hot' conditions and the heating element, correspondingly, would be intermittently powered. This could be avoided by use of a modified J1 control with the X1, the bimetal in the J1 control being replaced by a simple spring and a mechanical interconnection being provided between the push-rod in the X1 control and the trip lever of the J1. Operation of the X1 control would thus cause the J1 control to trip and open the contacts which would remain open, regardless of the condition of the bimetal in the X1, until the J1 was reset.

Having thus described the present invention by reference to exemplary embodiments, it will readily be appreciated that many changes could be made without departure from the general teachings of the invention. Thus, for example, whereas it is preferred to form the element head of a synthetic plastics material it could alternatively be formed as a deep drawn metal article. Also the shape of the resistance heating portion of the heating element, that is to say the form into which it is bent for purposes of compactness, could be varied, and the detailed shape and form of the enclosure could be varied. In particular, the end of the enclosure furthest from the head could be formed with an inwardly directed lip so as to reduce the gap between the element sheath and the end of the enclosure, in which case a small aperture might also be provided in the wall of the enclosure to ensure that an air bubble was not trapped therein when the associated vessel was filled.

I claim:

1. An electric immersion heating element for use in a water boiling vessel, said heating element comprising an elongate resistance heating portion to be immersed in use in water to be heated and an element head portion serving for mounting said heating element in said water boiling vessel, said resistance heating portion comprising an elongate metal sheath within which there is provided a resistance heating wire and said resistance heating wire being electrically insulated from said sheath, said elongate metal sheath having spaced apart ends and said ends being engaged with said element head portion, said resistance heating wire being shorter than said elongate metal sheath so that the resistance heating wire does not extend fully to the ends of the sheath whereby end portions of the sheath adjacent both ends thereof are not directly heated by the resistance heating wire and remain relatively cool in operation, electrical terminal portions extending from the ends of the sheath and, internally of the sheath, extending into contact with the resistance heating wire, a heat transfer element formed of a high thermal conductivity material connected to a directly heated portion of said sheath adjacent to one of said relatively cool end portions thereof and extending through said element head portion to provide for sensing of the temperature of the heating element in use, and an enclosure surrounding said directly heated portion, said enclosure being arranged so that it will fill with water when, in use of the heating element with a water boiling vessel, the vessel is filled, and said enclosure further being arranged so that, when the filled vessel is boiled, the onset of boiling and the consequent generation of steam in the enclosure will cause the water substantially to be expelled therefrom so as to mimic a dry boil situation which can be sensed by an appropriate thermally-responsive control thermally coupled to said heat transfer element.

2. An electric immersion heating element as claimed in claim 1 wherein the resistance heating portion of the element extends between its ends without any hot return portion making thermal contact with the element head portion.

3. An electric immersion heating element as claimed in claim 1 wherein the enclosure comprises a generally tubular member extending from the element head portion.

4. An electric immersion heating element as claimed in claim 1 wherein the enclosure is formed as an integral part of the element head portion.

5. An electric immersion heating element as claimed in claim 1 wherein the enclosure is formed as part of a seal which seals the ends of the resistance heating portion of the heating element relative to the element head portion.

6. An electric immersion heating element as claimed in claim 4 wherein the element head portion is formed of heat-resistant synthetic plastics material.

7. An electric immersion heating element as claimed in claim 1 wherein the heat transfer element comprises a tubular extension of the metal sheath of the resistance heating portion of the element.

8. An electric immersion heating element as claimed in claim 1 wherein the heat transfer element comprises an internal or external addition to the metal sheath of the resistance heating portion of the element.

9. An electric immersion heating element as claimed in claim 1 in combination with a thermally-responsive control having a temperature-sensitive actuator thermally coupled to said heat transfer element.

10. An electrically powered water boiling vessel incorporating a combination as claimed in claim 9.

11. An electric immersion heating element as claimed in claim 5 wherein the element head portion is formed of heat-resistant synthetic plastics material.

* * * * *